US010675907B2

(12) United States Patent
Sakai

(10) Patent No.: US 10,675,907 B2
(45) Date of Patent: Jun. 9, 2020

(54) IMAGE PROCESSING APPARATUS, IMAGE FORMING APPARATUS, AND NON-TRANSITORY COMPUTER READABLE MEDIUM WITH PRINTING USING A SPECIAL COLOR MATERIAL WITH SPECIFIC ABSORPTION PROPERTIES

(71) Applicant: FUJI XEROX CO., LTD., Tokyo (JP)

(72) Inventor: Noriko Sakai, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/698,872

(22) Filed: Sep. 8, 2017

(65) Prior Publication Data

US 2018/0239282 A1   Aug. 23, 2018

(30) Foreign Application Priority Data

Feb. 17, 2017   (JP) .................. 2017-027816

(51) Int. Cl.
| | |
|---|---|
| *B42D 25/00* | (2014.01) |
| *B42D 25/382* | (2014.01) |
| *H04N 1/00* | (2006.01) |
| *H04N 1/60* | (2006.01) |
| *H04N 1/54* | (2006.01) |
| *G03G 15/00* | (2006.01) |

(52) U.S. Cl.
CPC ....... *B42D 25/382* (2014.10); *G03G 15/6585* (2013.01); *H04N 1/00411* (2013.01); *H04N 1/54* (2013.01); *H04N 1/6088* (2013.01)

(58) Field of Classification Search
CPC combination set(s) only.
See application file for complete search history.

(56) References Cited

U.S. PATENT DOCUMENTS

| | | | |
|---|---|---|---|
| 8,120,819 B2 | 2/2012 | Hirokawa et al. | |
| 8,175,323 B2 | 5/2012 | Yamaguchi et al. | |
| 2012/0218608 A1* | 8/2012 | Maltz ................... | G06K 15/189 358/3.28 |
| 2014/0022603 A1* | 1/2014 | Eschbach ........... | H04N 1/32261 358/3.28 |
| 2016/0301830 A1* | 10/2016 | Shibata ................ | H04N 1/6036 |

FOREIGN PATENT DOCUMENTS

| | | |
|---|---|---|
| JP | 2004-268555 A | 9/2004 |
| JP | 2007-127999 A | 5/2007 |
| JP | 2007127999 A  * | 5/2007 |
| JP | 2009-071800 A | 4/2009 |
| JP | 2009-231923 A | 10/2009 |
| JP | 2010-139835 A | 6/2010 |
| JP | 2013-223144 A | 10/2013 |

\* cited by examiner

*Primary Examiner* — Barbara D Reinier
(74) *Attorney, Agent, or Firm* — Sughrue Mion, PLLC

(57) ABSTRACT

An image processing apparatus includes a reception unit and a conversion unit. The reception unit receives as a designated color a color of an image desired to be seeable when irradiated with light at a specific wavelength. The conversion unit converts, when converting image data on an image to be printed into print data, a color value of the designated color received by the reception unit into a color value including a value for outputting a special color material that has absorption properties for the light at the specific wavelength.

10 Claims, 15 Drawing Sheets

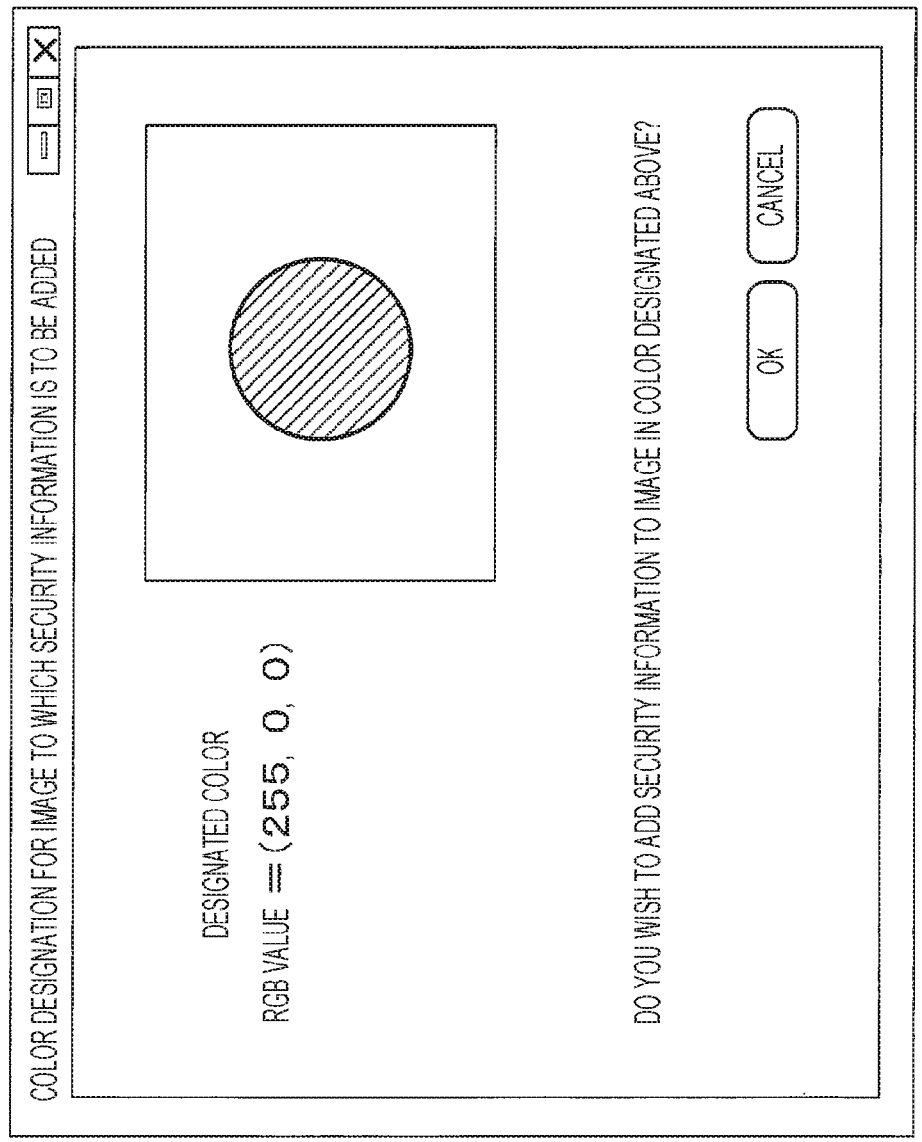

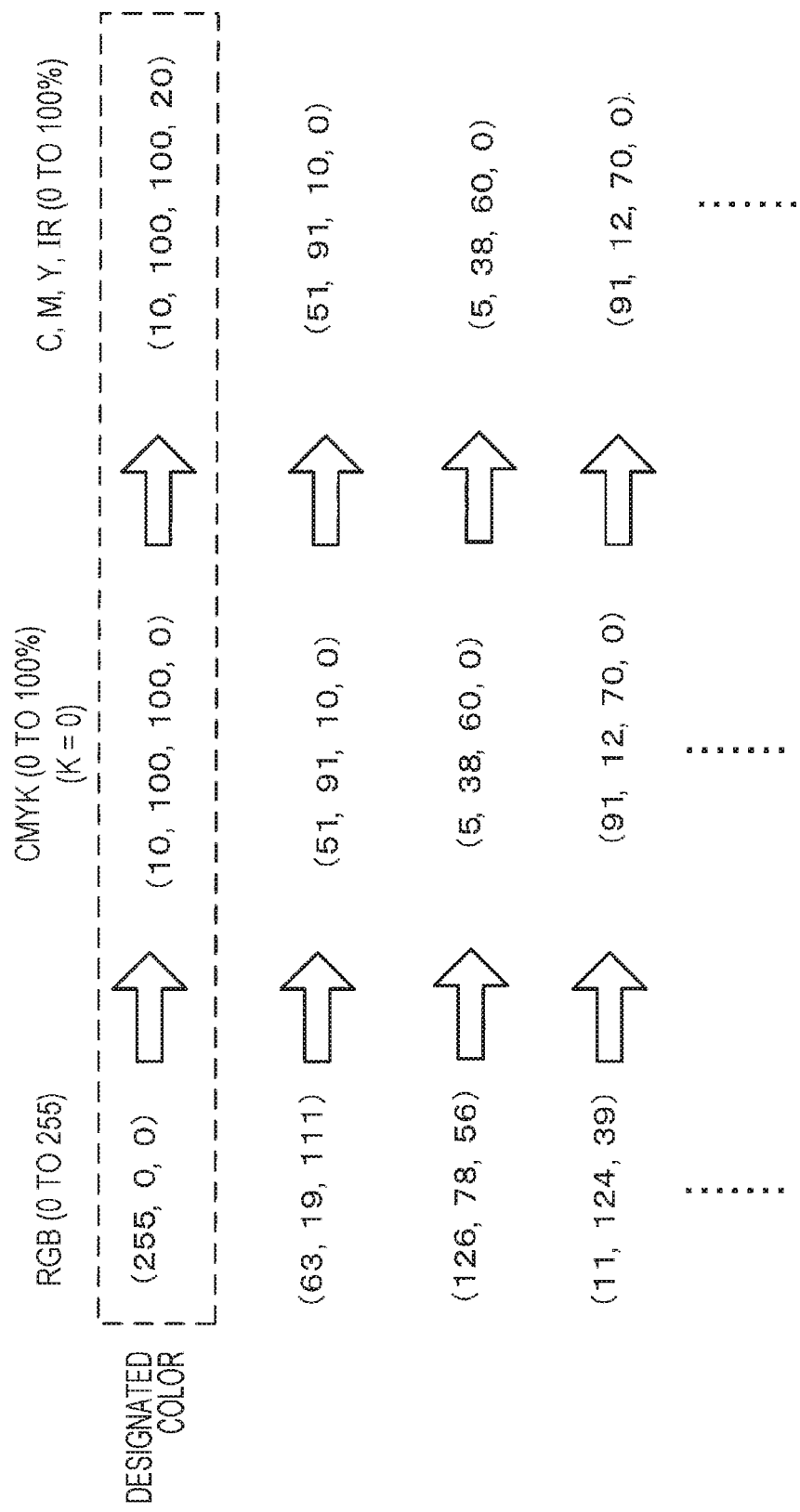

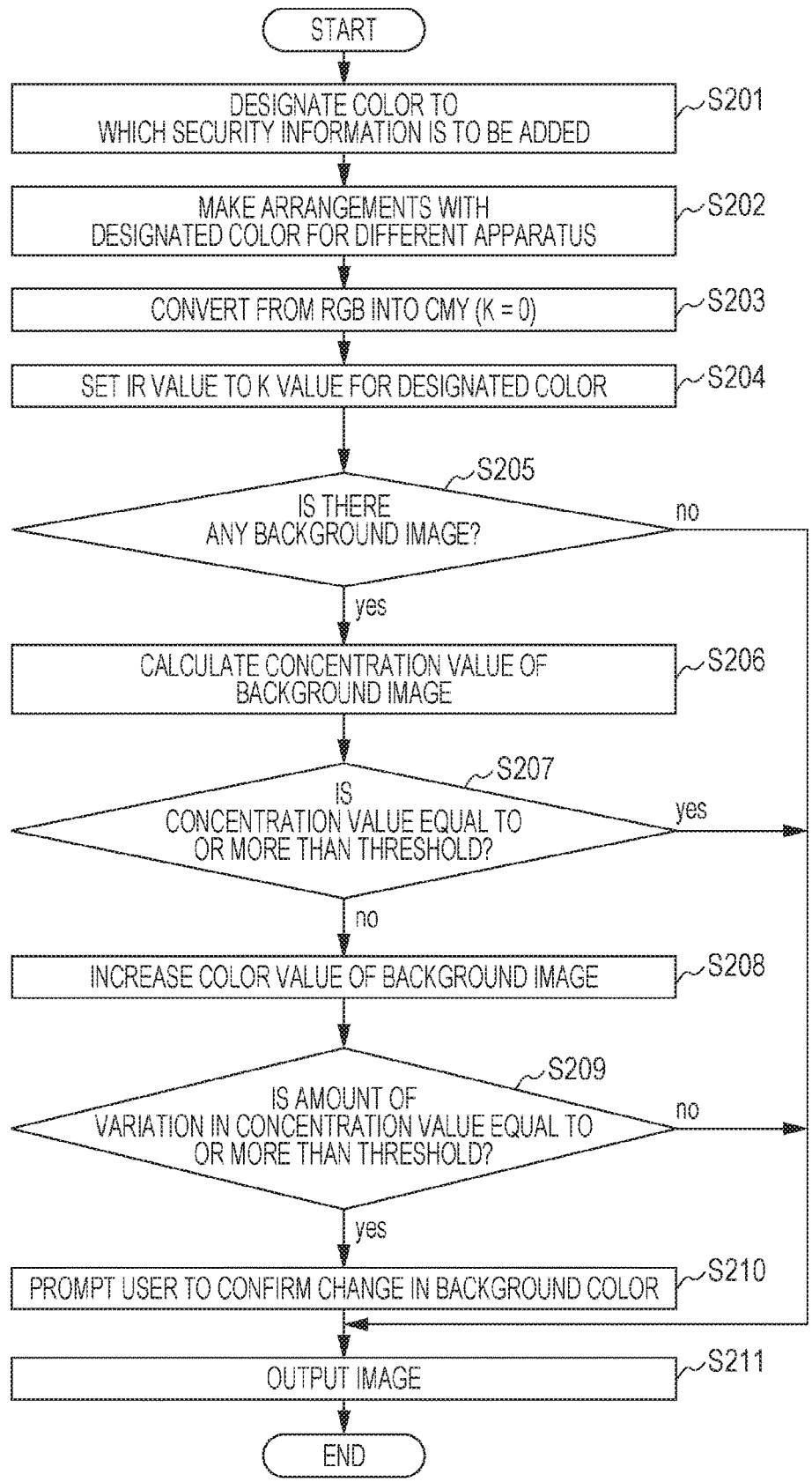

IMAGE PROCESSING APPARATUS, IMAGE FORMING APPARATUS, AND NON-TRANSITORY COMPUTER READABLE MEDIUM WITH PRINTING USING A SPECIAL COLOR MATERIAL WITH SPECIFIC ABSORPTION PROPERTIES

CROSS-REFERENCE TO RELATED APPLICATIONS

This application is based on and claims priority under 35 USC 119 from Japanese Patent Application No. 2017-027816 filed Feb. 17, 2017.

BACKGROUND

Technical Field

The present invention relates to an image processing apparatus, an image forming apparatus, and a non-transitory computer readable medium.

SUMMARY

According to an aspect of the present invention, there is provided an image processing apparatus including: a reception unit that receives as a designated color a color of an image desired to be seeable when irradiated with light at a specific wavelength; and a conversion unit that converts, when converting image data on an image to be printed into print data, a color value of the designated color received by the reception unit into a color value including a value for outputting a special color material that has absorption properties for the light at the specific wavelength.

BRIEF DESCRIPTION OF THE DRAWINGS

An exemplary embodiment of the present invention will be described in detail based on the following figures, wherein:

FIG. 8 illustrates an example of a confirmation screen for a designated color;

FIG. 9 specifically illustrates how image data in an RGB color space are converted into CMYIR print data;

FIG. 15 is a flowchart illustrating operation of the image forming apparatus performed when an IR toner image and a background image are printed as superposed on each other.

DETAILED DESCRIPTION

Now, an exemplary embodiment of the present invention will be described in detail below with reference to the drawings.

Figure 1:
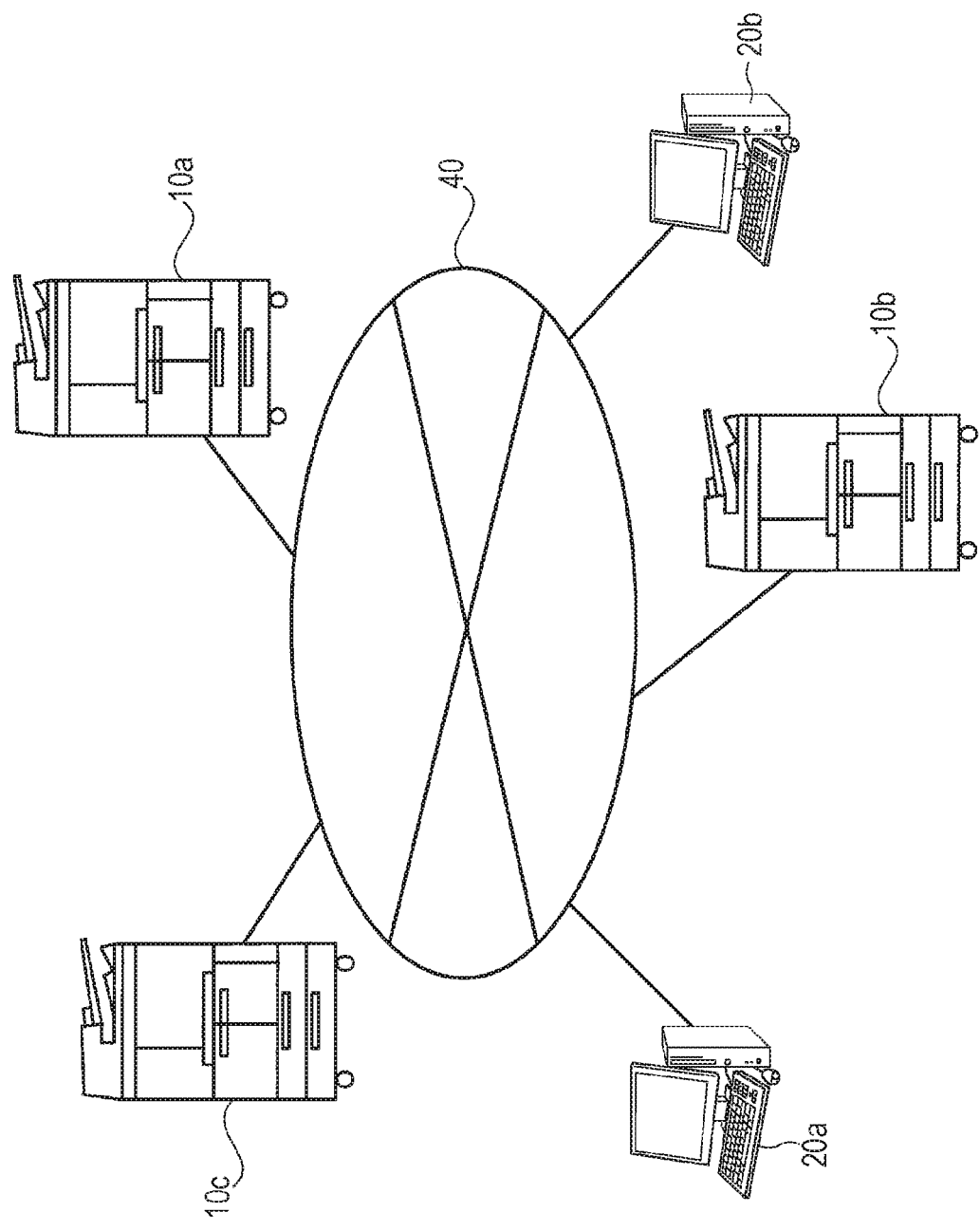
FIG. 1 is a system diagram illustrating the configuration of an image forming system according to an exemplary embodiment of the present invention.

FIG. 1 illustrates the system configuration of an image forming system according to an exemplary embodiment of the present invention.

As illustrated in FIG. 1, the image forming system according to the exemplary embodiment of the present invention is composed of image forming apparatuses 10a to 10c and terminal apparatuses 20a and 20b connected to each other through a network 40. The terminal apparatuses 20a and 20b generate print data, and transmit the generated print data to the image forming apparatuses 10a to 10c by way of the network 40. The image forming apparatuses 10a to 10c receive the print data transmitted from the terminal apparatuses 20a and 20b, and output an image that matches the print data onto paper. The image forming apparatuses 10a to 10c are so-called multi-function devices that have plural functions such as a printing function, a scanning function, a copying function, and a facsimile function.

The image forming apparatuses 10a to 10c are configured similarly to each other. Therefore, in the following description, the image forming apparatuses 10a to 10c will be represented as an "image forming apparatus 10". Similarly, the terminal apparatuses 20a and 20b will be represented as a "terminal apparatus 20".

Figure 2:
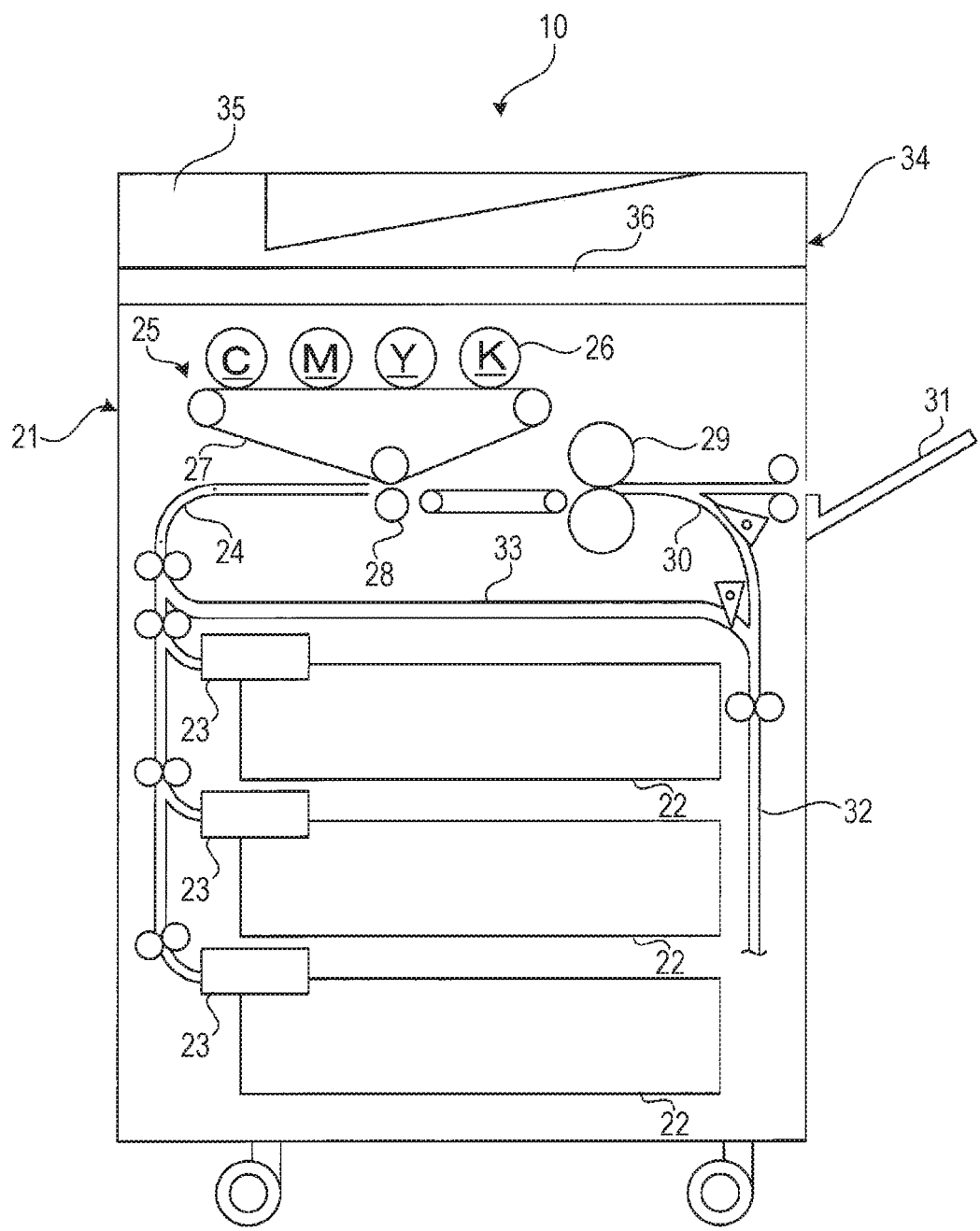
FIG. 2 is a sectional view illustrating the structure of an image forming apparatus according to the exemplary embodiment of the present invention.

Next, the structure of the image forming apparatus 10 according to the exemplary embodiment will be described with reference to the sectional view illustrated in FIG. 2.

The image forming apparatus 10 includes a printer 21 and an image reading device 34. The printer 21 includes three recording medium supply cassettes 22, for example. The recording medium supply cassettes 22 are provided with respective supply heads 23.

When one of the recording medium supply cassettes 22 is selected, the supply head 23 is actuated to supply a recording medium from the selected recording medium supply cassette 22 to an image forming section 25 via a recording medium supply path 24.

The image forming section 25 is provided with four image forming units that include photoconductors 26 for cyan (C), magenta (M), yellow (Y), and black (K), respectively, and an intermediate transfer belt 27.

A charging device, an exposure device, a developing device, a first transfer device, a cleaning device, and so forth (not illustrated) are disposed around each of the photoconductors 26. A toner image formed on each of the photoconductors 26 is transferred to the intermediate transfer belt 27. In the case where setting is made to perform monochrome printing, only components for black are made operable.

The toner image on the intermediate transfer belt 27 is transferred by a second transfer roller 28 to the recording medium which has been fed, and fixed by a fixing device 29. The recording medium to which the toner image has been fixed is ejected to an ejection tray 31 through a recording medium ejection path 30.

In the case where setting is made to perform double-sided printing, however, the recording medium, the surface of which has been fixed by the fixing device 29, is fed from the recording medium ejection path 30 to a reverse device 32, reversed by the reverse device 32, fed to a recording medium reverse path 33, returned to the recording medium supply path 24 again, and fed to the image forming section 25 to perform printing on the back surface.

The image reading device 34 includes an automatic document feed device 35 capable of reading a two-sided document. The automatic document feed device 35 feeds the document to a platen 36, on which an image in the document is read by a reading unit constituted of a charge-coupled device (CCD) or the like. The automatic document feed device 34 also serves as a platen cover. The document may be placed on the platen 36 by opening the platen cover. Whether the platen cover is open or closed is detectable by a platen cover open/close detector.

The image forming apparatus 10 is provided with a modem for facsimile connected to a public line, and a network communication device connected to a network such as a local area network (LAN). The image read by the image reading device 34 may be transmitted to a terminal connected to the network by using the network communication device provided to the image forming apparatus 10. By executing such a process, the image forming apparatus 10 also provides a function as a facsimile transmission device.

The image forming apparatus 10 according to the exemplary embodiment configured as discussed above is capable of executing a normal print process in which an image is output onto printing paper. In the exemplary embodiment, the image forming apparatus 10 uses an image that is not visually recognizable under natural light but that is seeable when irradiated with infrared light, which is light at a specific wavelength (at wavelengths of about 780 nm to 1 nm), as security information to be embedded in paper to be output.

Figure 3:
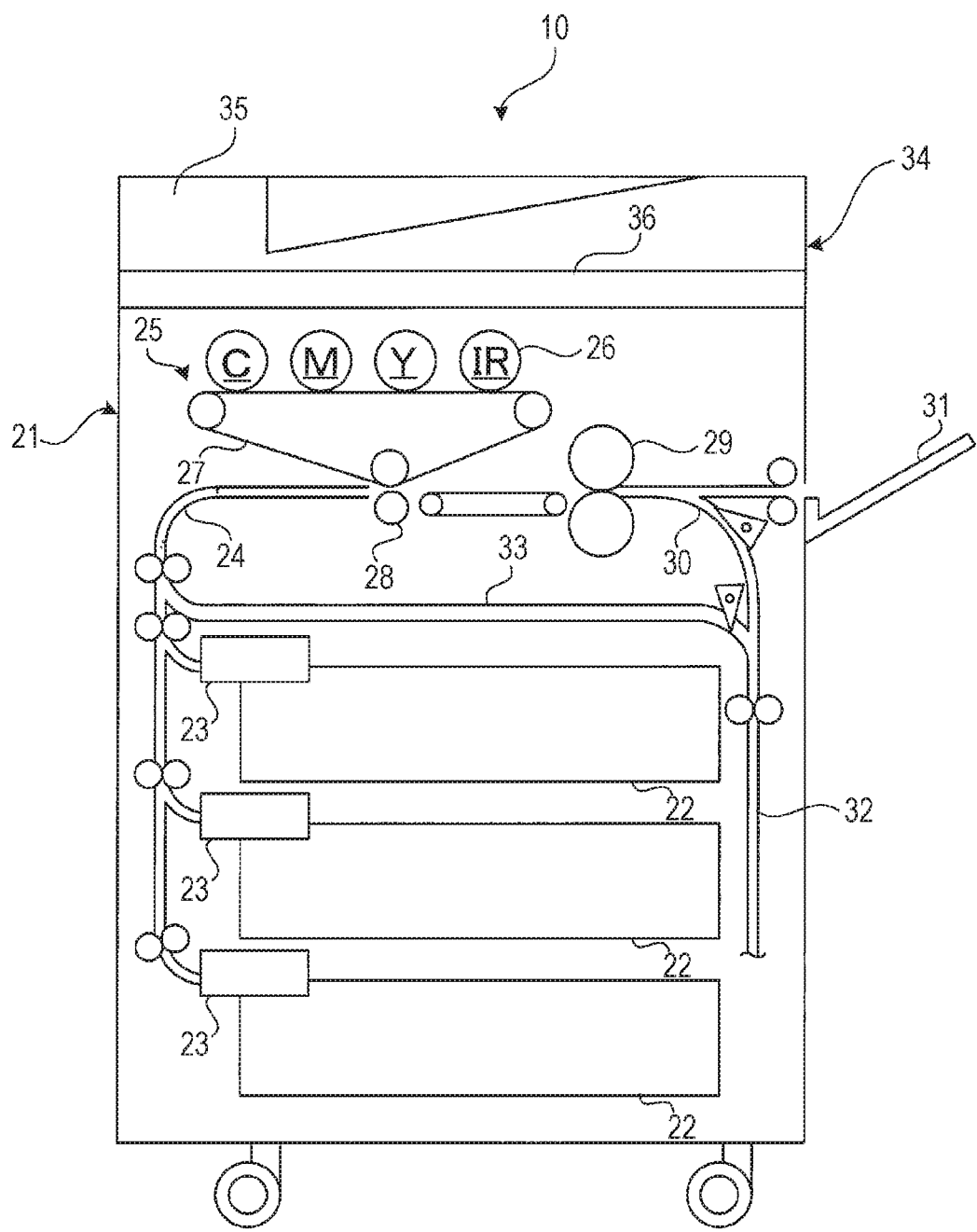
FIG. 3 illustrates how an infrared absorbing (IR) toner is set in place of a black (K) toner in the image forming apparatus.

To this end, as illustrated in FIG. 3, an infrared absorbing toner (hereinafter abbreviated as an "infrared (IR) toner") is set in place of the K toner in the image forming unit for K color, of the four image forming units, in the image forming apparatus 10 in the image forming system according to the exemplary embodiment. Specifically, a K toner bottle is replaced with an IR toner bottle. The K toner bottle may be replaced with the IR toner bottle when the image forming apparatus 10 is shipped from the factory or after the image forming apparatus 10 is installed at the place of use by a user. It should be understood that the IR toner bottle may be installed at the position for the K toner bottle from the beginning at the time of factory shipment, in order to eliminate the need to exchange the toner bottles.

The IR toner is a toner with a special color material that has absorption properties for light at a specific wavelength, that is, in the infrared region.

In the case where an image is formed on the printing paper using only the IR toner, the formed image is an invisible image that is not visually recognizable (that is not easily visually recognizable) under visible light (at wavelengths of about 380 nm to 780 nm).

The word "invisible" means to be not easily visually recognizable, and does not mean to be completely visually unrecognizable. Even the IR toner, which is an invisible toner, has some absorption properties in the visible region. Therefore, in the case where an image is formed on actually white paper using the IR toner, the image may be slightly colored to be visible.

In general, the K (black) toner is constituted of a black color material principally containing carbon black, and therefore has absorption properties in a wide region including the ultraviolet region, the visible region, and the infrared region.

However, the C (cyan), M (magenta), and Y (yellow) toners have absorption properties in the respective visible regions, but do not have absorption properties in the infrared region. Therefore, so-called process black, which is prepared by superposing the C, M, and Y toners on each other, does not have absorption properties in the infrared region.

When a black image is formed using the K toner in this way, the image may be confused with an image with the IR toner when irradiated with infrared light to discriminate the presence or absence of security information. Therefore, in the exemplary embodiment, the IR toner is set in place of the K toner in the image forming apparatus 10 as discussed above to form a black image using process black with the C, M, and Y toners. Specifically, image data prepared to be drawn using the C, M, Y, and K toners are subjected to a color conversion using a look-up table (LUT), for example, to be expressed using the C, M, and Y toners, or setting is made not to perform drawing using the K toner by not performing an under cover removal (UCR) process on print data in a CMY color space, and image information that is desired to be displayed using the IR toner is separately set to be drawn.

Figure 4:
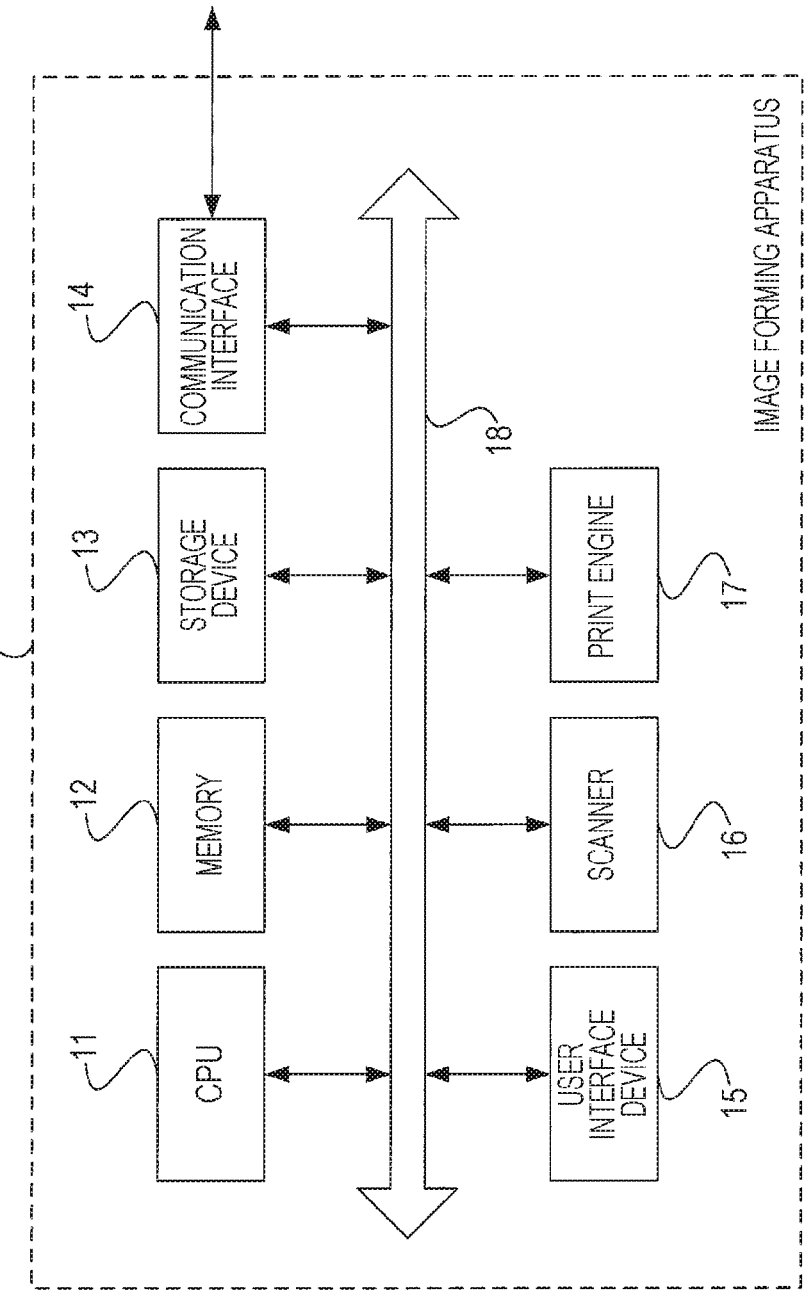
FIG. 4 is a block diagram illustrating the hardware configuration of the image forming apparatus according to the exemplary embodiment of the present invention.

Next, the hardware configuration of the image forming apparatus 10 in the image forming system according to the exemplary embodiment is illustrated in FIG. 4.

As illustrated in FIG. 4, the image forming apparatus 10 includes a central processing unit (CPU) 11, a memory 12, a storage device 13 such as a hard disk drive (HDD), a communication interface 14 that transmits and receives data to and from an external device or the like via a network, a user interface device 15 that includes a touch panel or a liquid crystal display and a keyboard, a scanner 16, and a print engine 17. Such components are connected to each other via a control bus 18.

The print engine 17 prints an image on a recording medium such as printing paper through processes such as charging, exposure, development, transfer, and fixation.

The CPU 11 controls operation of the image forming apparatus 10 by executing a predetermined process on the basis of a control program stored in the memory 12 or the storage device 13. In the exemplary embodiment, the CPU 11 reads and executes the control program stored in the memory 12 or the storage device 13. However, such a program may be stored in a storage medium such as a CD-ROM to be provided to the CPU 11.

Figure 5:
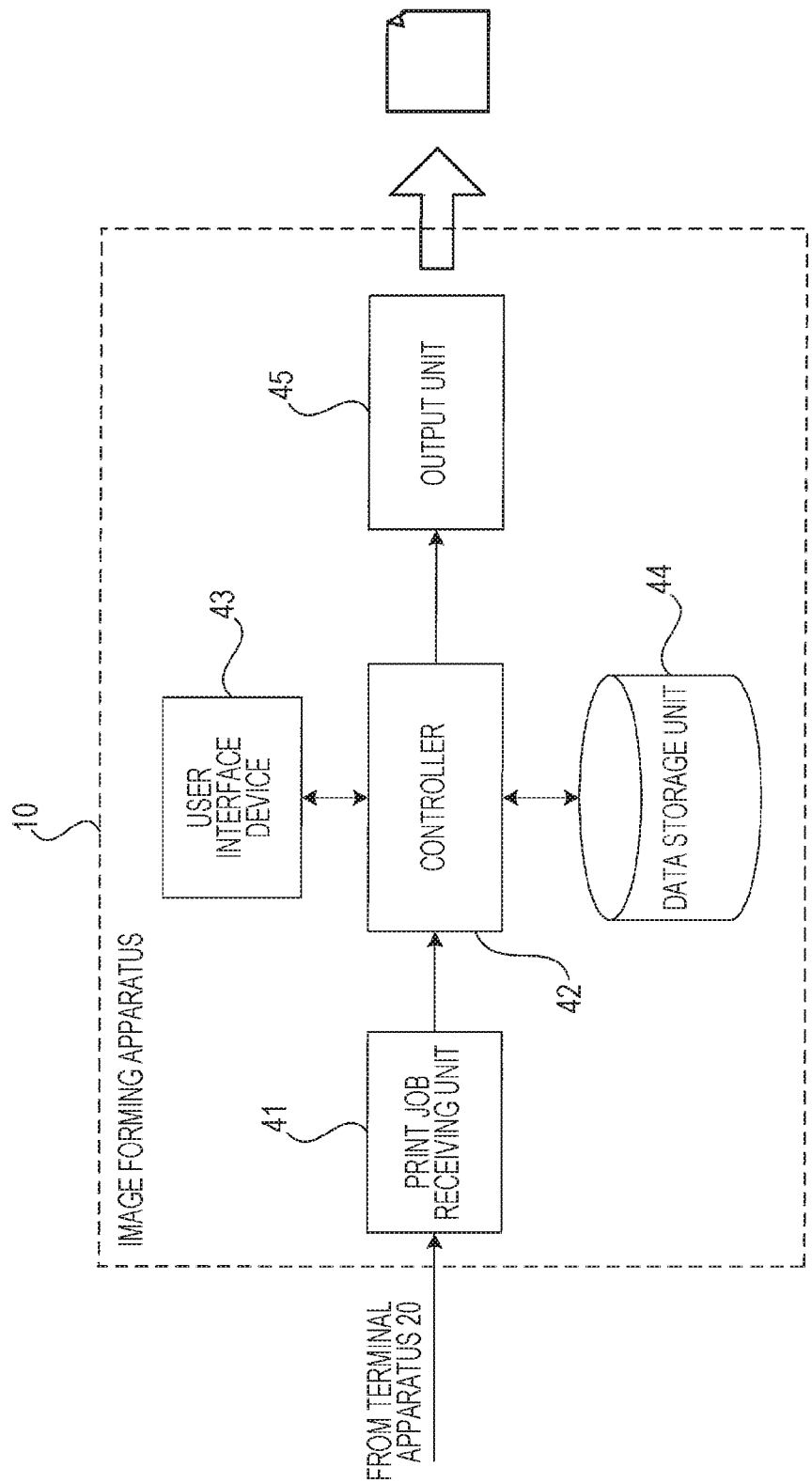
FIG. 5 is a block diagram illustrating the functional configuration of the image forming apparatus according to the exemplary embodiment of the present invention.

FIG. 5 is a block diagram illustrating the functional configuration of the image forming apparatus 10 which is implemented by executing the control program described above.

As illustrated in FIG. 5, the image forming apparatus 10 according to the exemplary embodiment includes a print job receiving unit 41, a controller 42, a user interface device 43, a data storage unit 44, and an output unit 45.

The print job receiving unit 41 communicates with the terminal apparatus 20 to receive a print job (print instruction) transmitted from the terminal apparatus 20.

The controller 42 converts the print job received by the print job receiving unit 41 into print data in a raster format by performing various drawing processes. The controller 42 temporarily stores the print data in the raster format after being subjected to the drawing processes in the data storage unit 44. The controller 42 executes a print process by transferring the print data stored in the data storage unit 44 to the output unit 45.

The user interface device 43 performs a display process for the user on the basis of control performed by the controller 42, and receives an instruction, setting, etc. from the user. The user interface device 43 receives the color of an image desired to be seeable when irradiated with light at a specific wavelength (infrared light) as a designated color.

The output unit 45 outputs an image onto a recording medium such as printing paper on the basis of the print data transferred from the controller 42.

In the case where printing is performed using regular toners in four colors, namely C, M, Y, and K, without the addition of security information, the controller 42 converts image data expressed in an RGB color space into print data expressed in a CMYK color space.

In the image forming apparatus 10 according to the exemplary embodiment, however, the K toner has been replaced with the IR toner as discussed above. Therefore, when converting image data on an image to be printed into print data, the controller 42 converts the color value of the designated color received by the user interface device 43 into a color value including a value for outputting the IR toner which is a special color material that has absorption properties for light at a specific wavelength. Receiving the color value of the designated color from the user interface device 43 is exemplary. The image forming apparatus 10 may receive image data that designate a color value or a region desired to be drawn using the IR toner through a network or the like, and the image data may be used as a value for outputting the IR toner.

Specifically, the controller 42 first performs a color conversion such that image data expressed in the RGB color space are drawn in the CMYK color space. The controller 42 further performs a color conversion using a look-up table (LUT) table, for example, such that the image data which have been subject to the color conversion into the CMYK color space (image data that have been subjected to a color conversion so as to be expressed using the C, M, Y, and K toners) are expressed using the C, M, and Y toners. Meanwhile, image information desired to be displayed using the IR toner and received by the user interface device 43 or the like is separately set to be drawn using the IR toner.

That is, by performing such processes, the controller 42 converts image data on an image to be printed into print data including a value for outputting the IR toner so that an invisible image constituted of the IR toner is output as superposed on an image in the designated color.

In the case where different pieces of security information for different departments, individuals, and devices, for example, are to be added to a single image, the controller 42 makes arrangements such that the designated color received by the apparatus is not identical or similar to a designated color for a different apparatus.

Specifically, in the case where the designated color received by the apparatus has already been designated for another apparatus, the controller 42 performs a process that prompts the user to change the designated color which has been received.

In the exemplary embodiment, the image forming apparatus 10 functions as an image processing apparatus that generates print data in the raster format on the basis of a print job from the terminal apparatus 20. However, the function of the image processing apparatus may be implemented by the terminal apparatus 20. For example, a printer driver installed in the terminal apparatus 20 may convert image data desired to be printed into print data in the raster format, and the image forming apparatus 10 may execute a print process on the basis of the print data which have been converted into the raster format. In such a case, the terminal apparatus 20 functions as the image processing apparatus.

Next, operation of the image forming apparatus 10 according to the exemplary embodiment will be described reference to the flowchart of FIG. 6.

In the following description, security information is to be added to the image illustrated in FIG. 7, by way of example.

First, the user interface device 43 receives designation of a color to which security information is to be added (step S101). In the description herein, a round image 51 in the image example illustrated in FIG. 7 is selected as an image to which security information is to be added. In this case, when the user designates the round image 51 by any operation method, a screen illustrated in FIG. 8, for example, is displayed to request the user to confirm the designated color. When the user operates the OK button on the screen example, a color with an RGB value of (255, 0, 0) is registered as the designated color.

The color to which security information is to be added may be designated by designating a CMYK value, rather than an RGB value. Alternatively, the image to which security information is to be added may be designated directly, or an image included in a certain region may be designated as the image to which security information is to be added when such a region is designated.

When the designated color is registered, the controller 42 checks whether the designated color does not overlap the designated color for a different device. In the case where the current designated color overlaps the designated color for a different device, the controller 42 makes arrangements by prompting the user to select a designated color for his/her device again, causing the different device to change the designated color therefor, etc. so that the final designated color for the device of the controller 42 does not overlap the designated color for the different device (step S102).

When the designated color is decided, the controller 42 converts image data in the RGB color space into print data for the C, M, Y, and special (CMYIR) toners using a direct look-up table (DLUT), for example. The specific procedures for converting image data in the RGB color space into print data to be output using the C, M, Y, and IR toners are as discussed above.

In the case where normal printing is performed using the C, M, Y, and K toners, the UCR process is performed to decide an output value for the K toner after image data in the RGB color space are converted into print data in the CMY color space. In the exemplary embodiment, however, in order to add security information, the UCR process is not performed, or the UCR value is set to zero, so that no output is made using the K toner (step S103) after image data in the RGB color space are converted into print data in the CMY color space.

The controller 42 performs drawing using the C, M, and Y toners in accordance with the CMY value which results from the conversion for colors other than the designated color, but obtains the final CMYIR value by setting a value for outputting the IR toner to the K value for the designated color (step S104). This corresponds to a case where the K toner is replaced with the IR toner in an apparatus that forms an image using the C, M, Y, and K toners. For an image forming apparatus designed to form an image using the C, M, Y, and IR toners from the beginning, a value for outputting the IR toner may be set not via the K value. That is, image data in the RGB color space may be prepared using the CMY value, and not using the K value, in the CMY color space and the IR value may be set as a value that is separate from the image data in the RGB color space to obtain the final CMYIR value, rather than setting a value for outputting the IR toner to the K value of the CMYK value to obtain the final CMYIR value.

Specifically, as illustrated in FIG. 9, the designated color RGB=(255, 0, 0) is converted into CMYK=(10, 100, 100, 0), and thereafter the K value of 0 is replaced with a value for outputting the IR toner to obtain CMYIR=(10, 100, 100, 20). For colors other than the designated color, the controller 42 uses the CMYK value, as it is, as the CMYIR value.

That is, as seen with reference to FIG. 9, the value which indicates an output of the IR toner when designating the amounts of output of toners in the various colors is 20%, for example, for the designated color, while the value which indicates an output of the IR toner is 0% for all the colors other than the designated color.

The output unit 45 executes an image output process by printing an image based on such print data on printing paper (step S105).

Figure 10A:
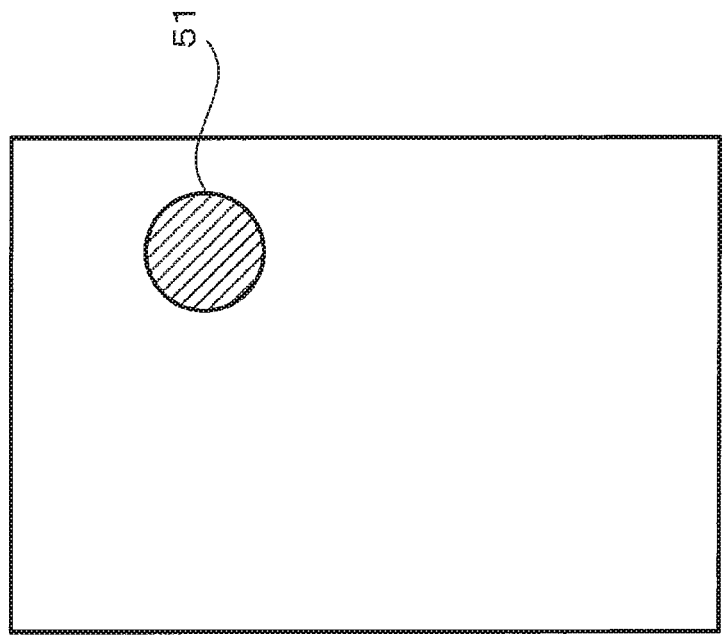
FIGS. 10A and 10B illustrate how an image output with the security information added thereto would look when seen under natural light and when captured by an infrared camera or the like under infrared irradiation.
Figure 10B:
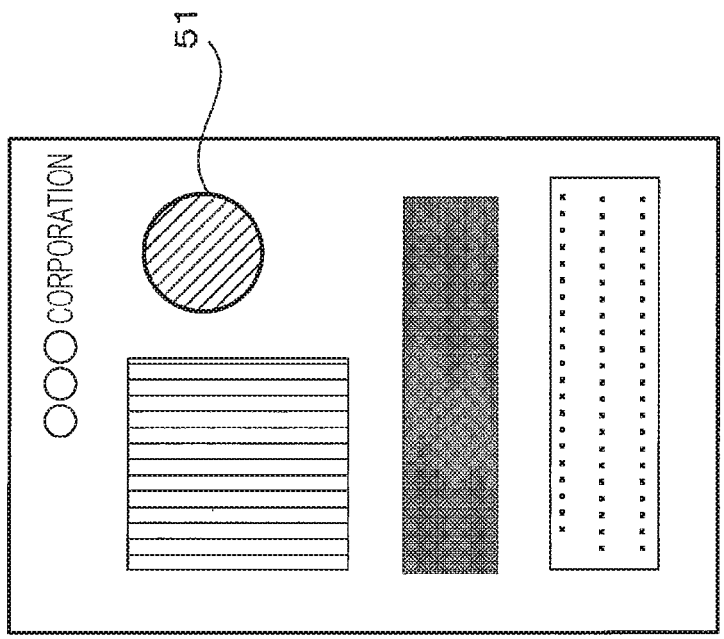

FIGS. 10A and 10B illustrate how the image output in this way would look when seen under natural light and when captured by an infrared camera or the like under infrared irradiation.

FIG. 10A illustrates how the output image would look when seen under natural light. The round image 51 is in the designated color, and therefore is formed using the IR toner together with the C, M, and Y toners. However, the IR toner has little absorption properties for visible light, and therefore hardly changes the color of the round image 51. To be exact, the IR toner itself has some tint under visible light, and therefore may change the color of the round image 51 to some degree.

However, the user is hardly able to discriminate that security information has been added and to which image security information has been added by just seeing the image illustrated in FIG. 10A.

FIG. 10B illustrates an image obtained by capturing the output image using an infrared camera or the like under infrared irradiation. With reference to the image illustrated in FIG. 10B, it is seen that the round image 51 is visually recognizable because of being formed using the IR toner which absorbs infrared light.

In this way, an image formed using the IR toner may be added as security information to a specific image at a specific location.

What color in an image is set as the designated color may be changed in accordance with the department, individual, company, printer, etc.

Figure 7:
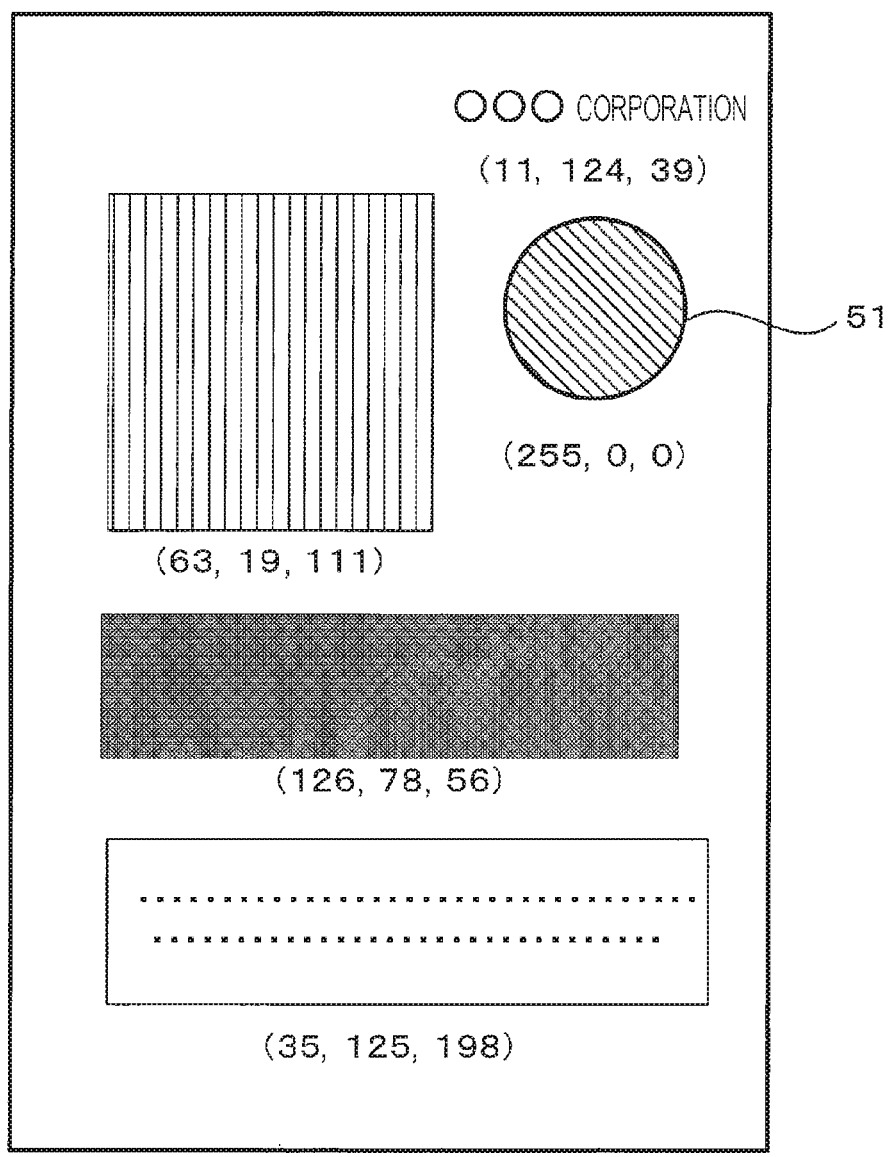
FIG. 7 illustrates an example of an image to which security information is to be added.
Figure 11A:
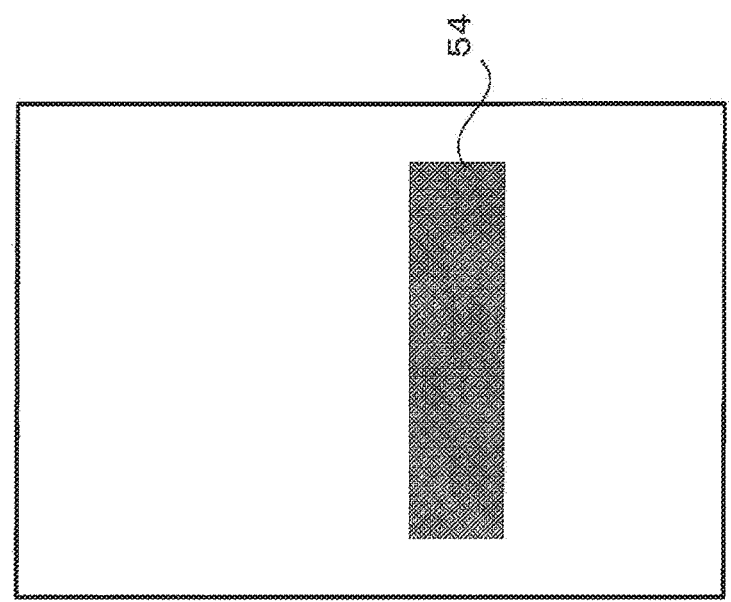
FIGS. 11A to 11C illustrate how different designated colors are set for A corporation, B corporation, and C corporation in the image illustrated in FIG. 7.
Figure 11B:
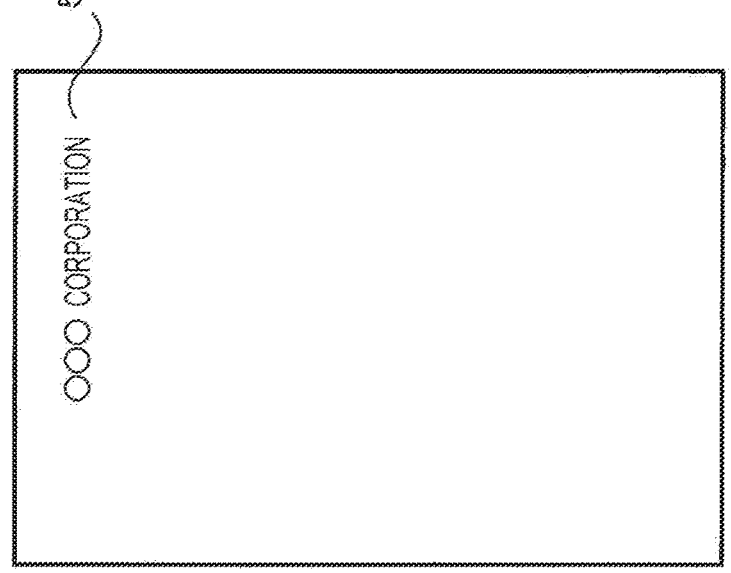
Figure 11C:
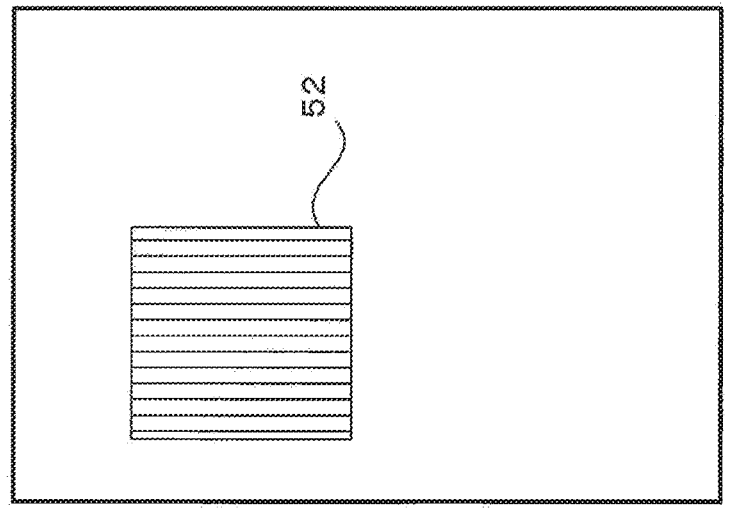

For example, when the image illustrated in FIG. 7 is printed at A corporation, B corporation, and C corporation, different designated colors may be set for the image forming apparatuses 10 of such companies as illustrated in FIGS. 11A to 11C.

If a designated color is selected from the colors of images that are present in an image as discussed above, the number of designated colors that may be set is limited in the case where the image contains a small number of colors.

Figure 12:
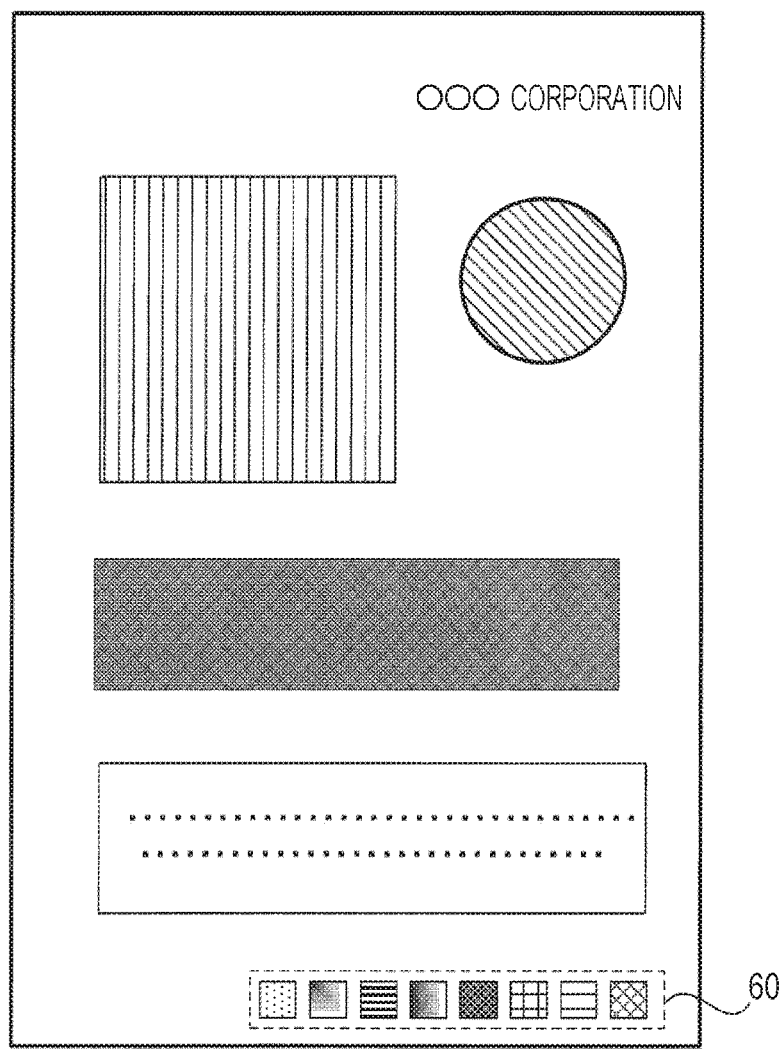
FIG. 12 illustrates how a discriminant image constituted from plural patch images constituted in various colors is provided in advance in a marginal portion or the like of an image.

Therefore, as illustrated in FIG. 12, a discriminant image 60 constituted from plural patch images constituted in various colors may be provided in advance in a marginal portion or the like of an image to increase the number of designated colors, irrespective of the content of the image.

Figure 13:
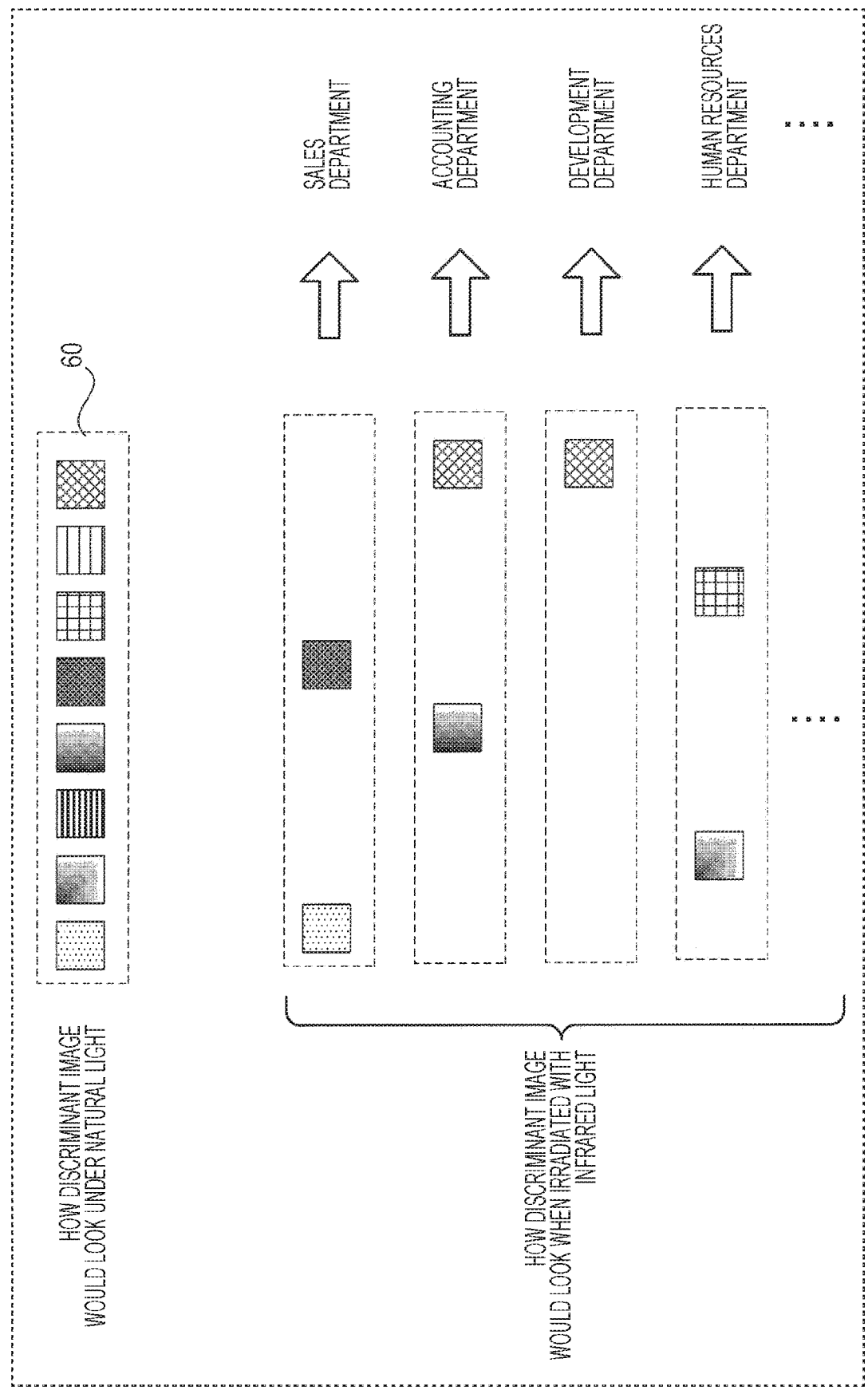
FIG. 13 illustrates how to determine what department printed a document printed with two of the patch images of the discriminant image, by setting two of the patch images of the discriminant image as designated colors for each department.

For example, as illustrated in FIG. 13, the colors of two patch images included in the discriminant image 60 may be set as the designated colors for each department.

Alternatively, the combination of patch images to be printed may be changed for each image forming apparatus 10.

Figure 14A:
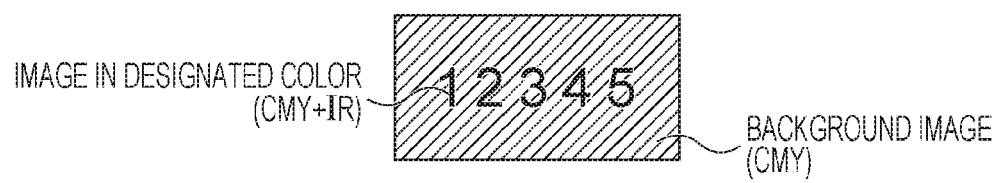
FIGS. 14A to 14C illustrate various patterns in which an image to which security information is to be added and a background image are printed as superposed on each other.

In the case where a print process such as overprint, in which a form image (an image constituted from at least one of a photograph object, a character object, a graphics object, etc.) is printed in a superposed manner is performed, an image in the designated color and a background image or the like are occasionally printed as superposed on each other as illustrated in FIG. 14A.

In the above description, the values of the C, M, and Y toners for the color value of the designated color are not changed, but the value of the K toner is replaced with the value of the IR toner. On the contrary, the controller 42 may convert the color value of the designated color into only a value for outputting the IR toner when converting image data on an image to be printed into print data. That is, an image with only the IR toner may be formed without forming an image using the C, M, and Y toners.

Figure 14B:
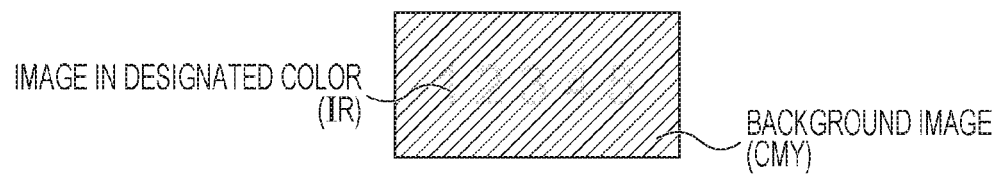
Figure 14C:

FIG. 14B illustrates an image with only the IR toner printed on a background image. FIG. 14C illustrates an image with only the IR toner directly printed on printing paper with no background image.

As illustrated in FIG. 14B, in the case where an image with only the IR toner is printed on a background image, the image with the IR toner may be visually recognizable if the concentration of the color of the background image is so low, depending on the color of the background image.

Therefore, in the case where the concentration value of the background image of the image formed with the IR toner is equal to or less than a value set in advance, the controller 42 may increase the concentration of the background image.

Operation of the image forming apparatus 10 for a case where such processes are performed will be described with reference to the flowchart of FIG. 15.

Figure 6:
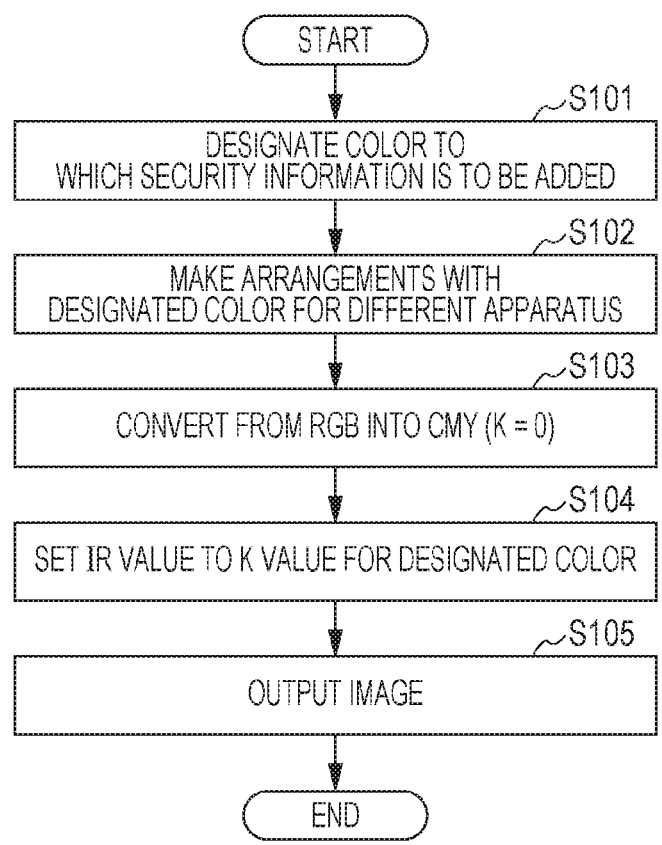
FIG. 6 is a flowchart illustrating operation of the image forming apparatus according to the exemplary embodiment of the present invention.

The processes in steps S201 to S203 in the flowchart of FIG. 15 are the same as the processes in steps S101 to S103 described in relation to the flowchart of FIG. 6, and therefore are not described.

When image data in the RGB color space are converted into print data expressed in the CMY color space, the controller 42 uses the CMYK value which results from the conversion, as it is, as the CMYIR value for colors other than the designated color, but obtains the final CMYIR value by replacing the CMYK value with a value for outputting the IR toner for the designated color (step S204).

That is, the controller 42 converts the value (10, 100, 100, 0) indicated in FIG. 9 into a value (0, 0, 0, 20) which indicates an output of only the IR toner.

In the case where there is a background image that overlaps the image (yes in step S205), the controller 42 calculates the concentration value of the background image (step S206).

In the case where the calculated concentration value is not equal to or more than a threshold set in advance (no in step S207), the controller 42 increases the concentration value of the background image (step S208).

In the case where the amount of variation in concentration value is so large (yes in step S209), the controller 42 indicates to the user that the concentration value is varied significantly, and requests the user to confirm the change (step S210).

When the change is confirmed, the controller 42 causes the output unit 45 to execute the output process on the basis of the print data which result from the conversion (step S211).

Also in the case where there is no background image that overlaps the image formed using the IR toner (no in step S205), in the case where the calculated concentration value is equal to or more than the threshold set in advance (yes in step S207), and in the case where the amount of variation in concentration value is not so large (no in step S209), the controller 42 causes the output unit 45 to execute the output process on the basis of the print data which result from the conversion (step S211).

[Modification]

In the exemplary embodiment described above, the K toner is replaced with the IR toner in the image forming apparatus which includes four image forming units. However, the present invention is not limited thereto. For example, in the case where the present invention is applied to an image forming apparatus that includes five image forming units, the IR toner may be used in addition to the regular toners in four colors, namely the C, M, Y, and K toners, and the IR toner may be used in place of the K toner in the case where printing is performed with the addition of the security information described above. The present invention is similarly applicable to an image forming apparatus that includes six or more image forming units, and the present invention may be implemented by setting the IR toner to any of the image forming units.

In the exemplary embodiment described above, the IR toner is used as a special toner that has absorption properties for invisible light. However, the present invention may similarly be implemented using a special toner that has absorption properties for invisible light other than infrared light such as ultraviolet light.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    at least one hardware processor configured to implement:
        a reception unit that receives a designated color of an image desired to be seeable when irradiated with light at a specific wavelength;
        a conversion unit that converts, when converting image data of an image to be printed into print data, a color value of the designated color received by the reception unit into a color value including a value for outputting a special color material that has absorption properties for the light at the specific wavelength;
        an output unit that outputs an image on a basis of the print data which result from a conversion performed by the conversion unit; and
        an arrangement unit that outputs a user prompt in response to determining that the designated color received by the reception unit is identical or similar to a designated color for a different apparatus.

2. The image processing apparatus according to claim 1, wherein the conversion unit converts, when converting the image data on the image to be printed into print data that designate amounts of cyan, magenta, yellow, and black color materials to be output, the image data into print data that do not allow outputting the black color material.

3. The image processing apparatus according to claim 1, wherein the conversion unit converts the image data on the image desired to be printed into print data including a value for outputting the special color material so that an invisible image constituted of the special color material is output as superposed on an image in the designated color received by the reception unit.

4. The image processing apparatus according to claim 1, wherein the special color material is an infrared absorbing color material that has absorption properties for infrared light.

5. The image processing apparatus according to claim 1, further comprising:
    a change unit that increases a value of a background image of an image formed using the special color material in a case where the value of the background image is less than a value set in advance.

6. The image processing apparatus according to claim 1, wherein the conversion unit is further configured to convert the image data by:
    receiving the designated color in an RGB color space,
    converting the designated color in the RGB color space to a cyan-magenta-yellow-black (CMYK) color space with a black (K) value set to zero and instead distributed among cyan (C), magenta (M) and yellow (Y) colors of the CMYK color space, and
    replacing the K value, in the CMYK color space, with an infrared (IR) value.

7. The image processing apparatus according to claim 1, wherein the user prompt comprises a request to a user to select a different designated color than the designated color received by the reception unit such that the different designated color is different than the designated color for the different apparatus.

8. An image forming apparatus comprising:
    at least one hardware processor configured to implement:
        a reception unit that receives a designated color of an image desired to be seeable when irradiated with light at a specific wavelength;
        a conversion unit that converts, when converting image data of an image to be printed into print data, a color value of the designated color received by the reception unit into a color value including a value for outputting a special color material that has absorption properties for the light at the specific wavelength;
        an output unit that outputs an image on a basis of the print data which result from a conversion performed by the conversion unit; and a change unit that increases a value of a background image of an image formed using the special color material in a case where the value of the background image is less than a value set in advance, wherein the change unit further outputs a user prompt in response to determining that a threshold is exceeded by an amount which the value is increased in the case where the value of the background image is equal to or more than the value set in advance.

9. A non-transitory computer readable medium storing a program causing a computer to execute a process comprising:

receiving a designated color of an image desired to be seeable when irradiated with light at a specific wavelength;

converting, when converting image data of an image to be printed into print data, a color value of the received designated color into a color value including a value for outputting a special color material that has absorption properties for the light at the specific wavelength, outputting an image on a basis of the print data which result from a conversion; and outputting a user prompt in response to determining that the designated color is identical or similar to a designated color for a different apparatus.

10. The image processing apparatus according to claim 8, wherein the value of the background image indicates concentration of a color of the background image.

* * * * *